(12) United States Patent
Guest

(10) Patent No.: US 7,644,959 B2
(45) Date of Patent: Jan. 12, 2010

(54) TUBE COUPLINGS FOR CONNECTING A PAIR OF CONDUITS FOR CARRYING A CABLE

(75) Inventor: John Derek Guest, Bray (GB)

(73) Assignee: John Guest International Limited, West Drayton, Middlesex (GB)

(*) Notice: Subject to any disclaimer, the term of this patent is extended or adjusted under 35 U.S.C. 154(b) by 80 days.

(21) Appl. No.: 11/620,392

(22) Filed: Jan. 5, 2007

(65) Prior Publication Data

US 2007/0200344 A1 Aug. 30, 2007

(30) Foreign Application Priority Data

Feb. 10, 2006 (GB) ................... 0602757.7

(51) Int. Cl.
 *F16L 21/02* (2006.01)
(52) U.S. Cl. .................... 285/342; 285/322; 285/151.1; 385/81
(58) Field of Classification Search ................. 285/322, 285/323, 342, 343, 345, 151.1, 149.1; 385/81, 385/84, 94

See application file for complete search history.

(56) References Cited

U.S. PATENT DOCUMENTS 5,088,804 A * 2/1992 Grinderslev ................. 385/81

FOREIGN PATENT DOCUMENTS

| EP | 0 363 188 A1 | 4/1990 |
|----|--------------|--------|
| GB | 1 520 742 | 8/1978 |
| JP | 2001-112142 | 4/2001 |
| WO | WO 96/11355 | 4/1996 |

\* cited by examiner

Primary Examiner—David E Bochna
(74) Attorney, Agent, or Firm—Workman Nydegger

(57) ABSTRACT

A tube coupling for connection to a conduit through which a cable may pass includes a coupling body having an open ended throughway to receive an end of the conduit and a tube locking device in the open end of the throughway for locking the conduit in the coupling body. The throughway has a reduced diameter section with an annular step at an end of the section facing towards the open end of the throughway to receive the end of the conduit inserted into the throughway. An annular flexible sealing member is disposed adjacent the step to be forced by an end of a tube inserted into the throughway into the reduced diameter section of the throughway. Compression of the annular flexible seal forces the seal into sealing engagement with a cable extending along the throughway to provide a seal between the coupling body and cable.

20 Claims, 1 Drawing Sheet

US 7,644,959 B2

TUBE COUPLINGS FOR CONNECTING A PAIR OF CONDUITS FOR CARRYING A CABLE

CROSS-REFERENCE TO RELATED APPLICATIONS

This application claims priority to United Kingdom Patent Application No. 0602757.7, filed Feb. 10, 2006, which is incorporated herein by reference.

BACKGROUND OF THE INVENTION

1. The Field of the Invention

This invention relates to tube couplings for connecting a pair of conduits through which a cable extends and more particularly although not exclusively for connecting a pair of conduits through which an optical fiber cable extends.

2. The Relevant Technology

Optical fibers are now commonly used for voice and data transmission lines. Optical fiber bundles are usually laid in conduiting to protect the fibers whether passing through underground channels or within buildings. Lengths of plastic conduit are provided coupled together by push-in tube coupling. The fiber is delivered through the conduiting by high pressure air which acts on a roughened surface of the fiber and draws the fibers through the conduiting. Once the fiber has been laid in the conduiting, it is desirable to be able to create a seal between the coupling and fiber to prevent passage of gas along the conduiting. Gas can enter the conduiting from a leak in the ground outside a building and if it is allowed to enter the conduiting and travel into the building to which the conduiting leads, there is a risk of a gas build up and possible explosion. There is therefore a need to isolate the interior of the conduit leading into the building from the rest of the conduit.

EP-A-0363188 discloses a tube coupling for connecting conduiting in which an optical fiber is laid. The coupling includes a complex form seal located in the coupling having end portions to receive and seal with conduit ends inserted into the coupling and a central section which can be displaced as air pressure to allow passage of an optical fiber through the coupling and which springs back to engage the tube once the air pressure is released. With this arrangement it is difficult to ensure an effective reliable seal with the fibre.

SUMMARY OF THE INVENTION

This invention provides a tube coupling for connection to a conduit through which a cable (e.g., an optical fiber cable) may pass, the coupling comprising a coupling body having an open ended throughway to receive an end of the conduit for carrying a cable, a tube locking device in the open ends of the throughway for locking the conduit in the coupling body, the throughway having a reduced diameter section part way along the throughway with an annular step at an end of the section facing towards the open end of the throughway to receive the end of the conduit inserted into the throughway, and an annular flexible sealing member disposed adjacent the step to be forced by an end of the tube inserted into the throughway into the reduced diameter section of the throughway, the resulting compression of the annular flexible seal forcing the seal into sealing engagement with a cable extending along the throughway to provide a seal between the coupling body and cable.

More specifically the step at one end of the reduced diameter section with which the annular seal is engageable may be inclined to provide a ramp leading from the throughway to the reduced section to guide the seal into the reduced section when pressed by a tube being inserted into the throughway.

In either of the above arrangements the annular seal may comprise an annular sleeve of flexible material.

More specifically the annular sleeve in uncompressed state may be longer than the reduced diameter section in the throughway.

In any of the above arrangements the locking devices in the open ends of the throughway comprise collets for gripping and locking the ends of the tube.

For example the collet at each end of the coupling body may comprise an annular head extending out of the throughway and having axially projecting legs extending into the throughway terminating in heads formed on their inner sides to grip a tube and emgageable on their outer sides with a tampered cam surfaces formed in the throughway which forces the heads into engagement with a tube as the collet is drawn outwardly of the throughway.

In any of the above arrangements a seal may be provided for engaging the outer surface of a tube adjacent at said end of the throughway adjacent the locking device

BRIEF DESCRIPTION OF THE DRAWINGS

The following is a description of some specific embodiments of the invention, reference being made to the accompanying drawings in which.

DETAILED DESCRIPTION OF THE PREFERRED EMBODIMENTS

Figure 1:
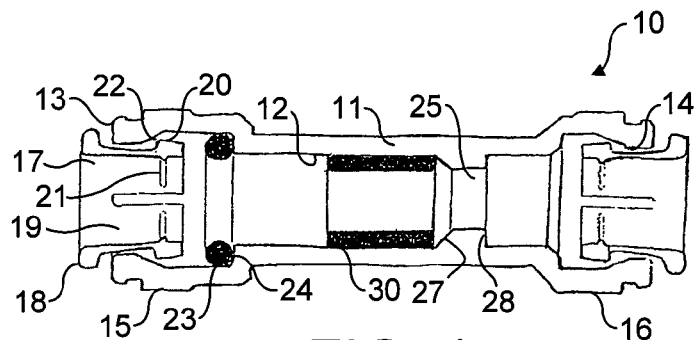
FIG. 1 is a cross-sectional view through a tube coupling for connecting lengths of optical fibre carrying conduiting with a gas block incorporated in the coupling.

Referring firstly to FIG. 1 of the drawings, there is shown an "in-line" tube coupling indicated generally at 10 for a pair of conduits for carrying an optical fiber bundle or cable. The fitting comprises an elongate coupling body 11 formed in a transparent plastics material to allow the inside of the body to be viewed. The coupling body has a throughway 12 extending between openings 13,14 at the ends of the body.

At each end of the coupling body enlarged sockets 15,16 are formed in which "push-in" type tube locking devices are provided of the type described and illustrated in our UK patent specification No. 1520742 for blocking conduit for carrying the optical fiber in the ends of the coupling body.

More specifically, each socket 15 contains a collet 17 comprising a head 18 projecting out of the socket and integrally formed with spaced axially extending arms 19 formed with enlarged heads. The heads have angled barbs or teeth 21 formed in metal and molded into the head to grip and engage a tube passing through the collets. The outer sides of the heads 20 are engageable with a tapered cam surface 22 formed on the inner side of the socket and reducing in cross-section towards the open end of the socket. After a tube has been inserted in the socket through the collet as described below, a slight movement of the tube outwardly of the socket draws the collet in an outward direction engaging the heads 20 of the arms 18 with the tube to grip and lock the tube against further outward movement.

One of the sockets indicated at 15 of the coupling which is intended to be "upstream" in the sense in which air pressure blows an optical fiber bundle through the conduits/couplings has an enlarged cavity in which an O-ring seal 23 is located against a shoulder 24 between the cavity and the main part of the throughway 12 to seal with the outer surface of the tube. This is intended to prevent loss of air pressure between the tube and socket during the step of blowing an optical fiber through the conduit linked by the coupling. O-ring seals can be provided in both upstream and downstream sockets of the coupling although an O-ring seal in the upstream socket is all that is strictly necessary.

The throughway 12 between the sockets 15,16 is formed with a short reduced diameter central section 25 having an inclined annular ramp 27 bridging the reduced diameter section and the main part of the throughway 12 on one side of the section 25 and an annular shoulder 28 on the other side of the central section and facing outwardly of the fitting through the socket 16.

A soft flexible rubber bung or sleeve 30 is located in the coupling body next to the ramp 27. The inner diameter of the sleeve is comparable to the reduced diameter of the section 25 and the length of the bung is approximately twice that of the section 25. The purpose of the sleeve will become apparent below.

Figure 2:
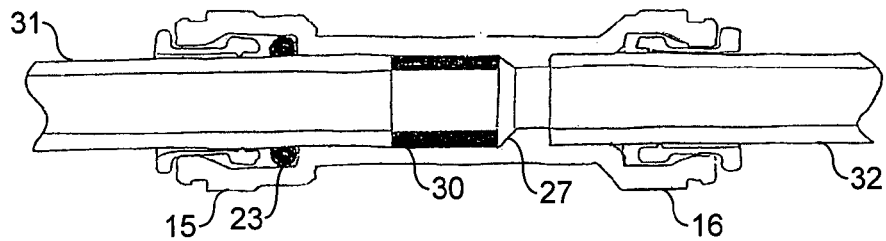
FIG. 2 is a similar view to that of FIG. 1 with a pair of tubes inserted into each end of the fitting with the gas block deactivated.
Figure 3:
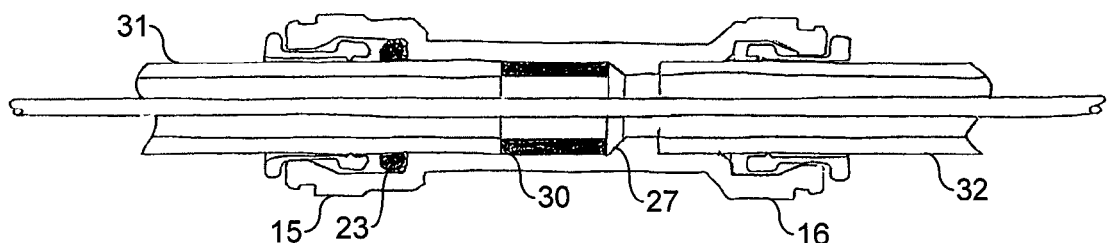
FIG. 3 is a similar view to that of FIG. 2 with an optical fiber bundle shown blown through the fitting by air pressure from one end of the conduiting.
Figure 4:
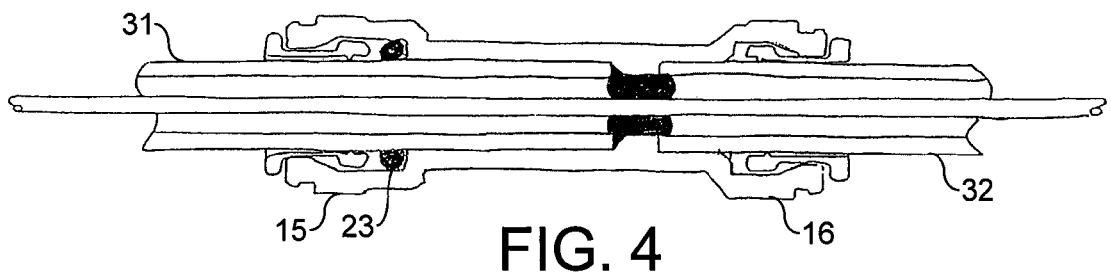
FIG. 4 is a cross-sectional view through the fitting with the optical fiber passing through the fitting and the gas seal activated to prevent gas flow from one conduit to the next.

FIG. 2 of the drawings shows the initial insertion of a pair of tubes into the fitting from either end thereof through the collets in the end sockets and into the main part of the throughway 12. The tube 31 inserted through socket 15 abuts the opposite end of the bung 30 to the ramp 27. The other tube 32 extends into the throughway 12 and abuts the annular shoulder 28 at one end of the central section 25. The transparency of the coupling body greatly facilitates the operator in doing this. The collets in the respective sockets 15,16 at each end of the coupling body grip and lock the tube to prevent the tubes from withdrawing from the coupling body. The O-ring seal 23 in the socket 25 seals with the outer surface of the tube 30 extending through the socket and it will be noted that the inner surface of the tube is substantially flush with the inner surface of the bung 30 which again is substantially flush with the reduced diameter section 25 in the throughway.

The connection is now ready for delivery of an optical fiber bundle or cable through the tubes/coupling and this is done by applying air pressure to the tube at the remote end of the conduit to drive the tube through the conduit and in particular through conduit 31 into the tube coupling through the bung 30 reduced diameter section 25 and into tube 32. Once the optical fiber has been positioned within the conduiting, the tube 31 is pressed further into the coupling using the end of the tube to force the bung 30 into the reduced diameter section 25 of the throughway the sleeve is compressed axially between the ends of the tubes 31 and 32 at the reduced diameter section 25 and the resulting axial compression of the bung enlarges the bung radially to engage and grip between the inner diameter of the reduced section of the coupling body and the outer surface of the optical fiber. At the same time end portions of the bung are forced into the ends of the tubes around the optical fiber to form seals between the fiber and the inner surface of the tube as well as a seal between the fiber and reduced diameter section 25 of the coupling body. As a result, a gas block which prevents gas from passing from conduit to conduit is created to prevent gas leaking into the conduiting at any station from penetrating along the conduiting and reaching the interior of the building to which the conduiting leads.

The drawings show a coupling with a rubber bung situated at the end of the tube location diameter in one end of the coupling which is conveniently formed from a transparent plastics. When the tube is inserted into the end adjacent the bung, the user stops inserting the tube when its end is near to the bung. Thereafter the fiber can be blown or pushed through. Finally the user can push the tube further so that it moves the bung into the smaller diameter section thereby compressing the bung on to the fiber and creating a seal.

It will be appreciated that the coupling can be either single or double ended. In the latter case the double ends are formed co-axially or in line with one another to facilitate delivery of the optical fiber through the coupling.

The coupling can have a spacer, which when the tube is inserted, is between the tube and the bung to help position the tube and help in the correct placement/compression of the bung.

The coupling can be supplied with a stem-ended connector with its stem inserted into the bung end with a spacer clip mounted on the stem to correctly position the bung in its initial position to allow a fiber to be blown or pushed through the connector. Thereafter the clip can be removed or moved to another position such that the stem can be pushed up to a stop indicating full and correct insertion/sealing of the bung.

Instead of a clip, the stem and connector body can have a series of steps or wings, etc. which, once rotated, allow further insertion to a stop to ensure correct insertion/sealing of the bung.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A tube coupling for connection to a conduit through which a cable may pass, the coupling comprising:
    a coupling body including a throughway, the throughway including:
        a first open end configured to receive an end of the conduit;
        a reduced diameter section disposed part way along the throughway; and
        an annular first step adjacent the reduced diameter section, the annular first step facing towards the first open end;
    a first locking device in the first open end of the throughway, the first locking device locking the conduit in the coupling body when the conduit is advanced into the throughway; and
    an annular flexible seal having an inner surface and an outer surface that extend between a first end face and an opposing second end face, the inner surface bounding a passage extending through the seal, the seal being movable between a first position in which an annular section of the seal is disposed within the throughway but outside of the reduced diameter section and in which the diameter of the inner surface of the seal is at least as large as the diameter of the reduced diameter section of the throughway, and a second position in which when the conduit is advanced into the throughway, the conduit presses the seal into the reduced diameter section of the throughway so that at least a portion of the outer surface of the seal is radially inwardly constricted within the reduced diameter section, the resulting compression of the seal in said second position forcing the annular section of the seal into sealing engagement with the cable when the cable extends along the throughway.

2. A tube coupling as claimed in claim 1, wherein the annular first step is inclined to provide a ramp leading to the reduced diameter section to guide the annular section of the seal into the reduced diameter section of the throughway when the seal is pressed by a conduit being inserted into the throughway.

3. A tube coupling as claimed in claim 1, wherein the annular seal comprises an annular sleeve of flexible material.

4. A tube coupling as claimed in claim 1, wherein when the seal is in the second position the first end of the seal projects out of a first end of the reduced diameter section and the second end of the seal projects out of a second end of the reduced diameter section.

5. A tube coupling as claimed in claim 1, wherein the locking device comprises a collet configured to grip and lock the conduit when the conduit is advanced into the throughway.

6. A tube coupling as claimed in claim 5, wherein the collet comprises an annular head extending out of the throughway and having axially projecting legs extending into the throughway and terminating in heads formed on their inner sides to grip the conduit and engageable on their outer sides with a tapered cam surfaces formed in the throughway which forces the heads into engagement with the conduit as the collet is drawn outwardly of the throughway.

7. A tube coupling as claimed in claim 1, further comprising a second seal disposed proximate the locking device, the second seal engaging the outer surface of the conduit when the conduit is advanced into the throughway.

8. A tube coupling as claimed in claim 1, further comprising:
the coupling body further comprising:
a second open end opposite the first open end; and
a annular second step adjacent the reduced diameter section, the annular second step facing towards the second open end; and
a second locking device in the second open end of the throughway.

9. A tube coupling as claimed in claim 8, further comprising:
a first tubular conduit disposed in the first open end of the coupling body, the first locking device locking the first tubular conduit in the coupling body;
a second tubular conduit disposed in the second open end of the coupling body, the second locking device locking the second tubular conduit in the coupling body;
a first cable including:
a first portion disposed in the first tubular conduit;
a second portion disposed in the second tubular conduit; and
a third portion disposed in the reduced diameter section of the throughway;
wherein the seal is in the second position and the annular section of the seal sealingly engages the third portion of the first cable disposed in the reduced diameter section of the throughway.

10. A system comprising:
a connector including a throughway extending therethrough, the throughway having a reduced diameter section;
a first conduit advanced into the throughway;
a cable extending through the throughway of the connector, the cable including a first portion disposed within the reduced diameter section of the throughway and a second portion disposed in the first conduit;
an annular flexible seal having an inner surface and an outer surface that extend between a first end face and an opposing second end face, the inner surface bounding a passage extending through the seal, the seal being movable between a first position in which an annular section of the seal is disposed within the throughway but outside of the reduced diameter section and a second position in which when the conduit is advanced into the throughway the conduit presses the annular section of the seal into the reduced diameter section of the throughway so that at least a portion of the outer surface of the annular section of the seal is radially, inwardly constricted within the reduced diameter section, the resulting compression of the annular section of the seal when the seal is in the second position forcing the annular section of the seal into sealing engagement with the cable; and
a second conduit advanced into the throughway of the connector on a side of the reduced diameter section opposite the first conduit, the cable extending through the second conduit.

11. A system as in claim 10, wherein when the seal is in the second position, a portion of the seal is disposed on a first side of the reduced diameter section of the throughway and a portion of the seal is disposed on an opposing, second side of the reduced diameter section of the throughway.

12. A system as in claim 10, further comprising a tapered, annular ramp formed on each an end of the reduced diameter section of the throughway.

13. A system as in claim 10, wherein the cable is a fiber optic cable.

14. A system as in claim 10, wherein the outer surface of the annular section of the seal when in the first position has an outer diameter that is greater than an inner diameter of the throughway extending through the reduced diameter section.

15. A system as in claim 10, wherein the first conduit advanced into the throughway has an outside diameter that is larger that the inside diameter of the reduced diameter section so that the first conduit cannot be advanced into the reduced diameter section.

16. A method comprising:
inserting an end of a first conduit into a throughway extending through a connector, the throughway having a reduced diameter section, a tubular flexible seal being movably positioned within the throughway between the end of the first conduit and the reduced diameter section, the tubular flexible seal having an outer surface that extends between a first end face and an opposing second end face, a cable passing through the throughway, the tubular flexible seal, and the first conduit;
advancing the first conduit into the throughway so that the first conduit presses at least a portion of the annular flexible seal into the reduced diameter portion, the outer surface of the tubular flexible seal passing into the reduced diameter portion being radially, inwardly constrict by the reduced diameter portion so that the tubular flexible seal seals against the cable passing therethrough and inserting an end of a second conduit into the throughway at an end of the connector opposite of where the first conduit is inserted.

17. A method as in claim 16, wherein the outer surface of the seal when in the first position has an outer diameter that is greater than an inner diameter of the throughway extending through the reduced diameter section.

18. A tube coupling for connection to a conduit through which a cable may pass, the coupling comprising:
- a coupling body including a throughway, the throughway including:
  - a first open end configured to receive an end of the conduit;
  - a reduced diameter section disposed part way along the throughway; and
  - an annular first step adjacent the reduced diameter section, the annular first step facing towards the first open end;
- a first locking device in the first open end of the throughway, the first locking device locking the conduit in the coupling body when the conduit is advanced into the throughway; and
- an annular flexible seal having an inner surface and an outer surface that extend between a first end face and an opposing second end face, the inner surface bounding a passage extending through the seal, the seal being movable between a first position in which an annular section of the seal is disposed within the throughway but outside of the reduced diameter section and a second position in which when the conduit is advanced into the throughway, the conduit presses the annular section of the seal into the reduced diameter section of the throughway so that at least a portion of the outer surface of the annular section of the seal is radially inwardly constricted within the reduced diameter section, the resulting compression of the annular section of the seal when the seal is in the second position forcing the annular section of the seal into sealing engagement with the cable when the cable extends along the throughway,
- wherein when the seal is in the second position the first end of the seal projects out of a first end of the reduced diameter section and the second end of the seal projects out of a second end of the reduced diameter section.

19. A tube coupling for connection to a conduit through which a cable may pass, the coupling comprising:
- a coupling body including a throughway, the throughway including:
  - a first open end configured to receive an end of the conduit;
  - a reduced diameter section disposed part way along the throughway; and
  - an annular first step adjacent the reduced diameter section, the annular first step facing towards the first open end;
- a first locking device in the first open end of the throughway, the first locking device locking the conduit in the coupling body when the conduit is advanced into the throughway; and
- an annular flexible seal having an inner surface and an outer surface that extend between a first end face and an opposing second end face, the inner surface bounding a passage extending through the seal, the seal being movable between a first position in which an annular section of the seal is disposed within the throughway but outside of the reduced diameter section and a second position in which when the conduit is advanced into the throughway, the conduit presses the annular section of the seal into the reduced diameter section of the throughway so that at least a portion of the outer surface of the annular section of the seal is radially inwardly constricted within the reduced diameter section, the resulting compression of the annular section of the seal when the seal is in the second position forcing the annular section of the seal into sealing engagement with the cable when the cable extends along the throughway,
- wherein the first locking device comprises a collet configured to grip and lock the conduit when the conduit is advanced into the throughway.

20. A tube coupling as claimed in claim 19, wherein the collet comprises an annular head extending out of the throughway and having axially projecting legs extending into the throughway and terminating in heads formed on their inner sides to grip the conduit and engageable on their outer sides with a tapered cam surfaces formed in the throughway which forces the heads into engagement with the conduit as the collet is drawn outwardly of the throughway.

\* \* \* \* \*

UNITED STATES PATENT AND TRADEMARK OFFICE
CERTIFICATE OF CORRECTION

PATENT NO. : 7,644,959 B2  Page 1 of 2
APPLICATION NO. : 11/620392
DATED : January 12, 2010
INVENTOR(S) : Guest It is certified that error appears in the above-identified patent and that said Letters Patent is hereby corrected as shown below:

Drawings
Sheet 1, Figure 1, replace with figure depicted below, wherein item number 13 has been corrected to point to the opening at the end of the body.

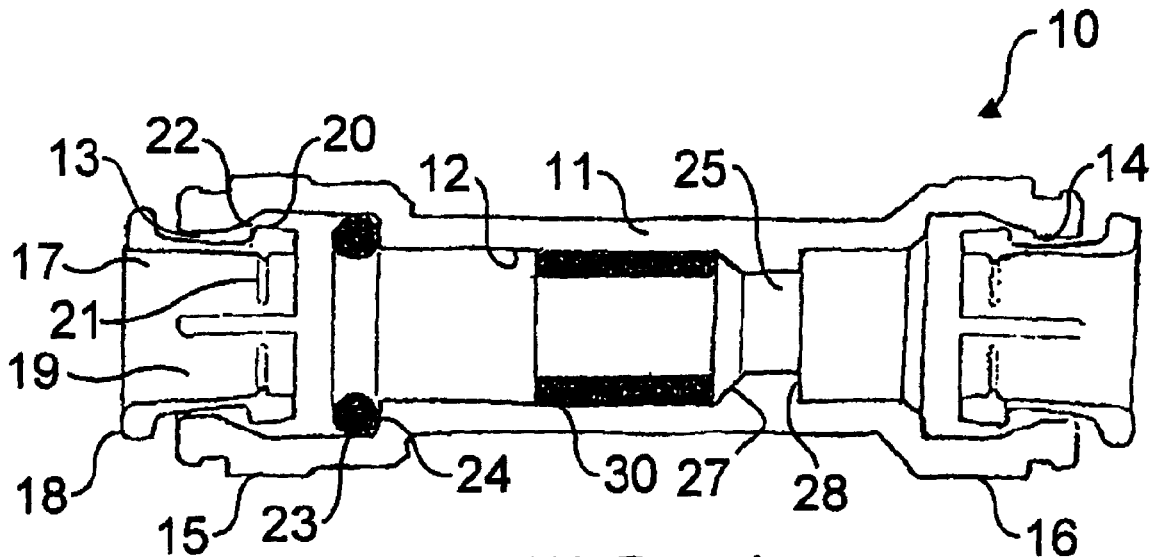

FIG. 1

Column 2
Line 15, change "emgageable" to --engageable--
Line 16, change "surfaces" to --surface--
Line 20, remove [adjacent]

Signed and Sealed this

Twenty-third Day of November, 2010

David J. Kappos
*Director of the United States Patent and Trademark Office*

Column 3
Line 50, change "conduit" to --tube--

Column 4
Line 5, change "formed from a transparent" to --formed from transparent--

Column 5
Lines 3-4, remove [annular sec-tion of the]
Line 28, change "surfaces" to --surface--
Line 39, change "a annular" to --an annular--

Column 6
Line 31, remove [each]
Line 41, change "larger that the" to --larger than the--
Line 60-61, change "therethrough and" to --therethrough; and--
Line 61, before "inserting" insert a paragraph break Column 8
Line 37, change "surfaces" to --surface--